United States Patent
Pan et al.

(10) Patent No.: US 11,086,170 B1
(45) Date of Patent: Aug. 10, 2021

(54) DISPLAY DEVICE

(71) Applicant: Himax Display, Inc., Tainan (TW)

(72) Inventors: Po-Hung Pan, Tainan (TW);
Hsing-Lung Wang, Tainan (TW);
Hua-Hsin Wang, Tainan (TW);
Ying-Chin Huang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/879,720

(22) Filed: May 20, 2020

(51) Int. Cl.
*G02F 1/1337* (2006.01)
*G02F 1/1339* (2006.01)

(52) U.S. Cl.
CPC .......... *G02F 1/1339* (2013.01); *G02F 1/1337* (2013.01); *G02F 2201/50* (2013.01)

(58) Field of Classification Search
CPC ... G02F 1/1339; G02F 1/1337; G02F 2201/50
See application file for complete search history.

(56) References Cited

U.S. PATENT DOCUMENTS

| | | | | |
|---|---|---|---|---|
| 5,381,255 A * | 1/1995 | Ohnuma | ............... | G02F 1/1339 349/106 |
| 2007/0139603 A1* | 6/2007 | Saegusa | .............. | G02F 1/13392 349/155 |
| 2008/0062374 A1* | 3/2008 | Katsumura | ........... | G02F 1/1339 349/153 |
| 2012/0145901 A1* | 6/2012 | Kakiuchi | ................. | G02B 5/22 250/330 |
| 2013/0213852 A1* | 8/2013 | Yamazaki | .............. | H05B 33/04 206/701 |
| 2015/0378195 A1* | 12/2015 | Shlmura | ............... | G02F 1/1339 349/123 |
| 2015/0378196 A1* | 12/2015 | Ochiai | .................. | G02F 1/1339 349/123 |
| 2016/0011445 A1* | 1/2016 | Chen | ..................... | G02F 1/1337 349/110 |

FOREIGN PATENT DOCUMENTS

JP 63008633 A * 1/1988

* cited by examiner

*Primary Examiner* — Hoan C Nguyen
(74) *Attorney, Agent, or Firm* — JCIPRNET

(57) ABSTRACT

A display device includes a first substrate, a second substrate, a display medium layer, a sealant, a first film layer, a first protection pattern, and a first alignment layer. The display medium layer is disposed between the first substrate and the second substrate. The sealant is disposed between the first substrate and the second substrate and surrounds the display medium layer. The first film layer is disposed on the first substrate between the first substrate and the display medium layer. The first protection pattern is disposed between the first film layer and the sealant. The first alignment layer is disposed on the first substrate between the first film layer and the display medium layer. The first protection pattern is in contact with the sealant and exposed by the first alignment layer. The first protection pattern and the first alignment layer are both in contact with the first film layer.

20 Claims, 13 Drawing Sheets

DISPLAY DEVICE

BACKGROUND

Technical Field

The disclosure is related to an electronic device, and particular to a display device.

Description of Related Art

Display technique is one of the notable topics in the modern electronic devices and products. A display panel may commonly include two substrates, a display medium layer sandwiched between the two substrates and a sealant sealing the display medium layer between the two substrates. On the two substrates, a plurality of film layer may be formed to achieve required functions such as driving, alignment, protection and the like. However, the display panel may face different issues when applied in various applications.

SUMMARY

The disclosure is directed to a display device with desirable quality.

A display device in accordance with some embodiments includes a first substrate, a second substrate, a display medium layer, a sealant, a first film layer, a first protection pattern, and a first alignment layer. The display medium layer is disposed between the first substrate and the second substrate. The sealant is disposed between the first substrate and the second substrate and surrounds the display medium layer. The first film layer is disposed on the first substrate between the first substrate and the display medium layer. The first protection pattern is disposed between the first film layer and the sealant. The first alignment layer is disposed on the first substrate between the first film layer and the display medium layer. The first protection pattern is in contact with the sealant and exposed by the first alignment layer. The first protection pattern and the first alignment layer are both in contact with the first film layer.

In accordance with some embodiments, a light transmittance of the first protection pattern at a wavelength in a range of 150 nm to 400 nm is lower than 50%.

In accordance with some embodiments, a light transmittance of the protection pattern at a wavelength in a range of 500 nm to 560 nm is lower than 50%.

In accordance with some embodiments, a light transmittance of the protection pattern at a wavelength in a range of 1000 nm to 1200 nm is lower than 50%.

In accordance with some embodiments, the sealant and the protection pattern both extend along a common ring path.

In accordance with some embodiments, the protection pattern is discontinuously arranged along the common ring path.

In accordance with some embodiments, the protection pattern is a multi-layer stack.

In accordance with some embodiments, the multi-layer stack includes a low refractive index layer and a high refractive index layer, the low refractive index layer has a refractive index lower than 2, and the high refractive index layer has a refractive index greater than 2.

In accordance with some embodiments, a material, may be a dielectric material, of the low refractive index layer comprises $SiO_2$.

In accordance with some embodiments, a material, may be a dielectric material, of the high refractive index layer comprises one or more selected from $TiO_2$, $Nb_2O_5$, and $Ta_2O_5$.

In accordance with some embodiments, a material of the protection pattern includes a metal.

In accordance with some embodiments, the first alignment layer includes an inner alignment portion and an outer alignment portion, and the sealant is positioned between the inner alignment portion and the outer alignment portion.

In accordance with some embodiments, a portion of the protection layer exceeds the sealant and is covered by the first alignment layer.

In accordance with some embodiments, the first film layer is an electrode layer.

In accordance with some embodiments, the display device further includes an active device array formed on the first substrate.

In accordance with some embodiments, the first film layer is an insulation protection layer covering the active device array.

In accordance with some embodiments, the display device further includes a second alignment layer disposed on the second substrate between the second substrate and the display medium layer.

In accordance with some embodiments, the display device further includes a second film layer disposed on the second substrate between the second alignment layer and the second substrate.

In accordance with some embodiments, the display device further includes a second protection pattern disposed between the second substrate and the sealant, wherein the second protection pattern is in contact with the sealant and exposed by the second alignment layer and the second protection pattern and the second alignment layer are both in contact with the second film layer.

In accordance with some embodiments, one of the first film layer and the second film layer is an electrode layer and the other is an insulation protection layer.

In light of the foregoing, the display device in accordance with some embodiments of the disclosure includes the protection pattern covering the film layer on the substrate and extending along with the sealant. The protection pattern may protect the underlying film layer from damage caused by incoming radiation such as UV light or the like.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
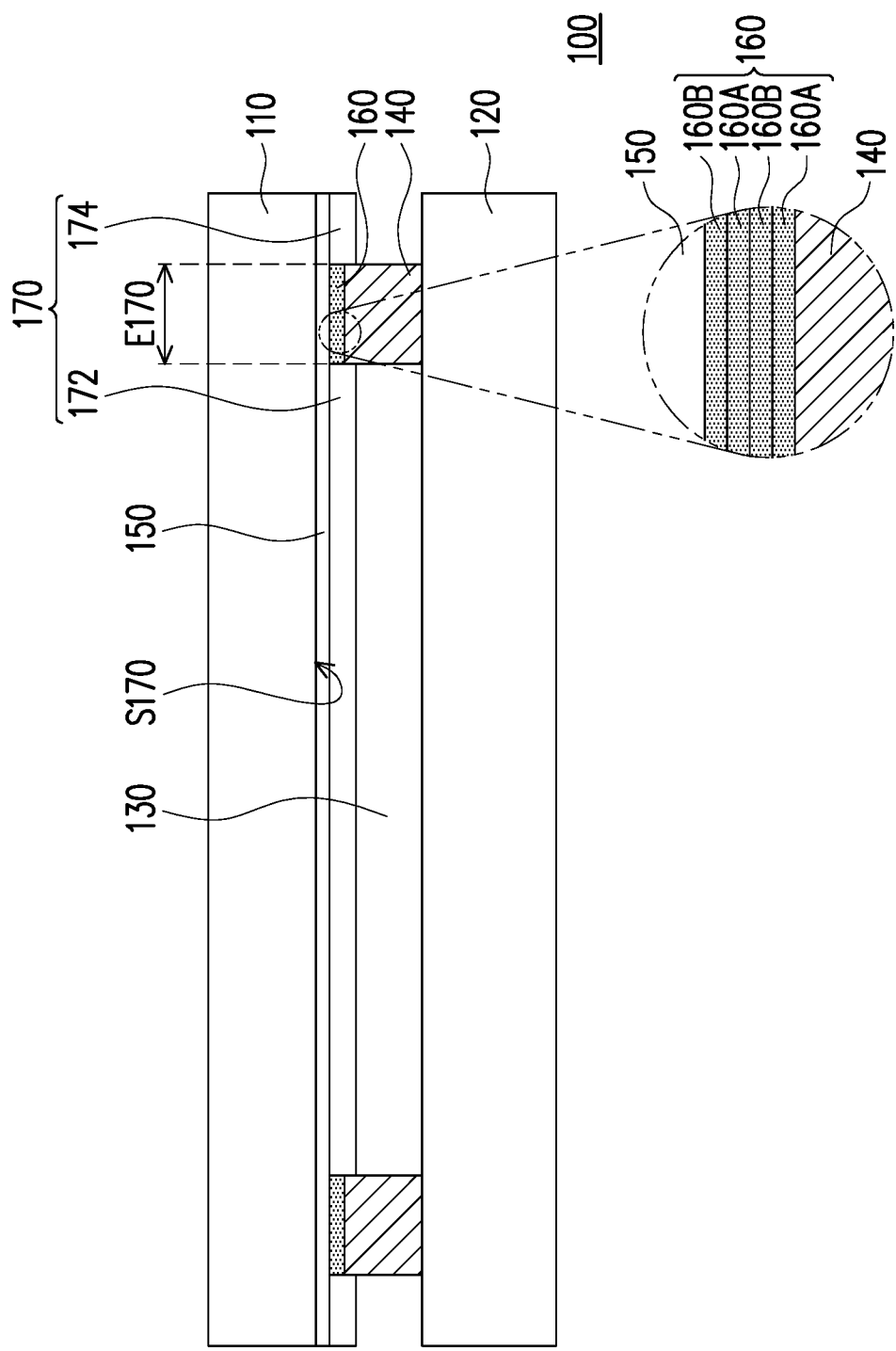
FIG. 1 schematically illustrates a display device in accordance with an embodiment of the disclosure.

FIG. 1 schematically illustrates a display device in accordance with an embodiment of the disclosure. A display device 100 in FIG. 1 at least includes a first substrate 110, a second substrate 120, a display medium layer 130, and a sealant 140. The first substrate 110 and the second substrate 120 are stacked in a top and bottom manner, and the shapes and the sizes of the first substrate 110 and the second substrate 120 viewed in the thickness direction may be substantially the same, but in some alternative embodiments, one of the first substrate 110 and the second substrate 120 may be larger than the other. The display medium layer 130 is disposed and sandwiched between the first substrate 110 and the second substrate 120 and is surrounded by the sealant 140. The first substrate 110, the second substrate 120 and the sealant 140 may completely surround and seal the display medium layer 130 so that the display medium layer 130 may be isolated from the external environment. In some embodiments, the display medium layer 140 may be a liquid crystal layer so that the first substrate 110, the second substrate 120, the display medium layer 130 and the sealant 140 together form a liquid crystal panel. In other words, the display device 100 may be a liquid crystal display device, but the disclosure is not limited thereto.

The display device 100 further includes a film layer 150, a protection pattern 160, and an alignment layer 170 that are disposed on the first substrate 110. The film layer 150 is disposed on the first substrate 110 between the first substrate 110 and the display medium layer 130. The protection pattern 160 is disposed between the film layer 150 and the sealant 140. The alignment layer 170 is disposed between the film layer 150 and the display medium layer 130. The protection pattern 160 is in contact with the sealant 140 and the alignment layer 170 is patterned to expose the protection pattern 160. In addition, the protection pattern 160 and the alignment layer 170 are both in contact with the film layer 150. In FIG. 1, the second substrate 120 is simplified while certain components and/or layers on the second substrate 120 are omitted for the illustration purpose. For example, in some embodiments, another alignment layer, and/or one or more film layers may be formed on the second substrate 120. In some alternative embodiments, another protection pattern may be disposed between the sealant 140 and the second substrate 120.

In some embodiments, the film layer 150 formed on the first substrate 110 may be an electrode layer used for generating a required electric field to drive the display medium layer 130 to display images. In the case the film layer 150 is an electrode layer, the first substrate 110 may be a glass substrate or a polymer substrate that allows radiation, such as visible light, to pass through, but the disclosure is not limited thereto. In addition, an active device array (not shown) serving as a pixelized driving layer may be formed on the second substrate 120 and the required electric field to drive the display medium layer 130 may be generated by the collaboration of the film layer 150 and the active device array (not shown).

In alternative embodiments, the film layer 150 may be an insulation protection layer. Specifically, an active device array (not shown) serving as a pixelized driving layer may be further formed on the first substrate 110, and the film layer 150 covers the active device array to serve as a protection layer. The film layer 150 serving as an insulation protection layer may be made of silicon oxide, silicon nitride, silicon oxynitride, or a combination thereof.

The protection pattern 160 is formed on the first substrate 110 and positioned corresponding to the sealant 140. The protection pattern 160 may be formed on the first substrate 110 by a deposition process followed by a patterning process such as a lithography and etching process, but the disclosure is not limited thereto. In some embodiments, when viewed the display device 100 in the thickness direction, the sealant 140 and the protection pattern 160 may extend along a common ring path and the sealant 140 overlaps the protection pattern 160. In addition, the protection pattern 160 may have specific optical property for protecting the film layer 150 from damages caused in the process performed to remove the alignment layer 170 in the absent region E170 after the formation of the protection pattern 160.

In some embodiments, a light transmittance of the protection pattern 160 at a wavelength in a range of 150 nm to 400 nm may be lower than 50%; a light transmittance of the protection pattern 160 at a wavelength in a range of 500 nm to 560 nm may be lower than 50%; and/or a light transmittance of the protection pattern 160 at a wavelength in a range of 1000 nm to 1200 nm may be lower than 50%. In some embodiments, the optical property of the protection pattern 160 may be determined by the subsequent process performed after the formation of the protection pattern 160. For example, a laser irradiation process may be performed after the formation of the protection pattern 160, and the optical property of the protection pattern 160 may be determined based on the wavelength of the laser radiation used in the laser irradiation process.

In the embodiment, the protection pattern 160 may be a multi-layer stack. The multi-layer stack may include low refractive index layers 160A and high refractive index layers 160B stacked alternatively. Each of the low refractive index layers 160A may have a refractive index lower than 2, and each of the high refractive index layers 160B may have a refractive index greater than 2. In some embodiments, the material of the low refractive index layer 160A may include $SiO_2$ and the material of the high refractive index layer 160B may include $TiO_2$, $Nb_2O_5$, and $Ta_2O_5$, but the disclosure is not limited thereto. In the embodiment, two low refractive index layers 160A and two high refractive index layers 160B are shown and arranged in a manner that one low refractive index layers 160A is stacked on one high refractive index layer 160B. However, the quantity of the low refractive index layer 160A and the quantity of the high refractive index layer 160B may be determined based on the required optical property. In some alternative embodiments, the protection pattern 160 may be a single layered structure which is formed by only one single layer. A material of the protection pattern 160 with a single layer design may include a metal such as Al, Ag, Au, Cu, etc.

In FIG. 1, the width of the protection pattern 160 may be substantially the same as the width of the sealant 140. Nevertheless, in some embodiments, the width of the protection pattern 160 may be greater than the width of the sealant 140. For example, a portion of the protection pattern 160 may exceed the sealant 140 and extend away from and/or toward the display medium layer 130. In the case the protection pattern 160 exceeds the sealant 140 and extends towards the display medium layer 130, the overlap width of the protection pattern 160 overlapping the display medium layer 130 may be restricted so that the protection pattern 160 does not cover a display region of the display device 100. In other words, when viewed the display device 100 in the thickness direction, the protection pattern 160 may be absent in the region capable of displaying images, which may minimized the influence of the protection pattern 160 on the display effect. In addition, a thickness of the protective pattern 160 may be in a range of 200 nm to 2 μm, but the disclosure is not limited thereto. Specifically, the size/dimension of the protection pattern 160 may be determined based on various design requirements.

The alignment layer 170 is formed on the first substrate 110 in contact with the display medium layer 130. An inner surface S170 of the alignment layer 170 may be in contact with the display medium layer 130 and have microstructures capable of rendering the material of the display medium layer 130 to arrange in a designated orientation and/or tilt. The alignment layer 170 may be made of an organic material such as polyimide or alternatives, but the disclosure is not limited thereto. In some embodiments, the alignment layer 170 may be formed on the first substrate 110 by a coating process to cover the film layer 150.

In some embodiments, the alignment layer 170 is formed after the protection pattern 160 is formed on the first substrate 110. The alignment layer 170 may be thicker than the protection pattern 160, but the disclosure is not limited thereto. The alignment layer 170 is patterned to have the desired pattern. Specifically, the alignment 170 may be patterned to include an inner alignment portion 172 and an outer alignment portion 174. In some embodiments, the inner alignment portion 172 may completely cover the region surrounded by the sealant 140, or at least continuously and completely cover the display region of the display device 100. In addition, the outer alignment portion 174 may be separated from the inner alignment portion 172 by an absent region E170. In the embodiment, the protection pattern 160 may be formed in the absent region E170 without the material of the alignment layer 170 so that the film layer 150 is not exposed in the absent region E170. In some embodiments, the outer alignment portion 174 may be omitted so that the alignment layer 170 may include only the inner alignment portion 172.

In some embodiments, the alignment layer 170 may be patterned by a laser ablation process. The laser utilized in the laser ablation process may include a femtosecond laser or a picosecond laser. The laser utilized in the laser ablation process may have sufficient energy to remove the material of the alignment layer 170 to form the absent region E170. In addition, the laser utilized in the laser ablation process may be strong enough to also damage the material of the film layer 150 when irradiating on the film layer 150. However, in the embodiment, the protection pattern 160 at least covers the absent region E170 and the optical property of the protection pattern 160 is so determined to limit the laser utilized in the laser ablation process to irradiate the film layer 150, which prevents the film layer 150 from the damage caused by the laser for patterning the alignment layer 170. For example, the protection pattern 150 may have low transmittance at the wavelength of the laser radiation. Alternatively, the protection pattern 150 may have high reflectivity, for example higher than 85%, at the wavelength of the laser radiation, and/or high absorption at the wavelength of the laser radiation. Accordingly, the protection pattern 160 at least protects the film layer 150 in the process of forming the alignment layer 170 so as to ensure the yield of the display device 100. In some embodiments, the structure of the protection pattern 160 and the alignment layer 170 may be applied to the second substrate 120 and to any substrate described in the following embodiments.

Figure 2:
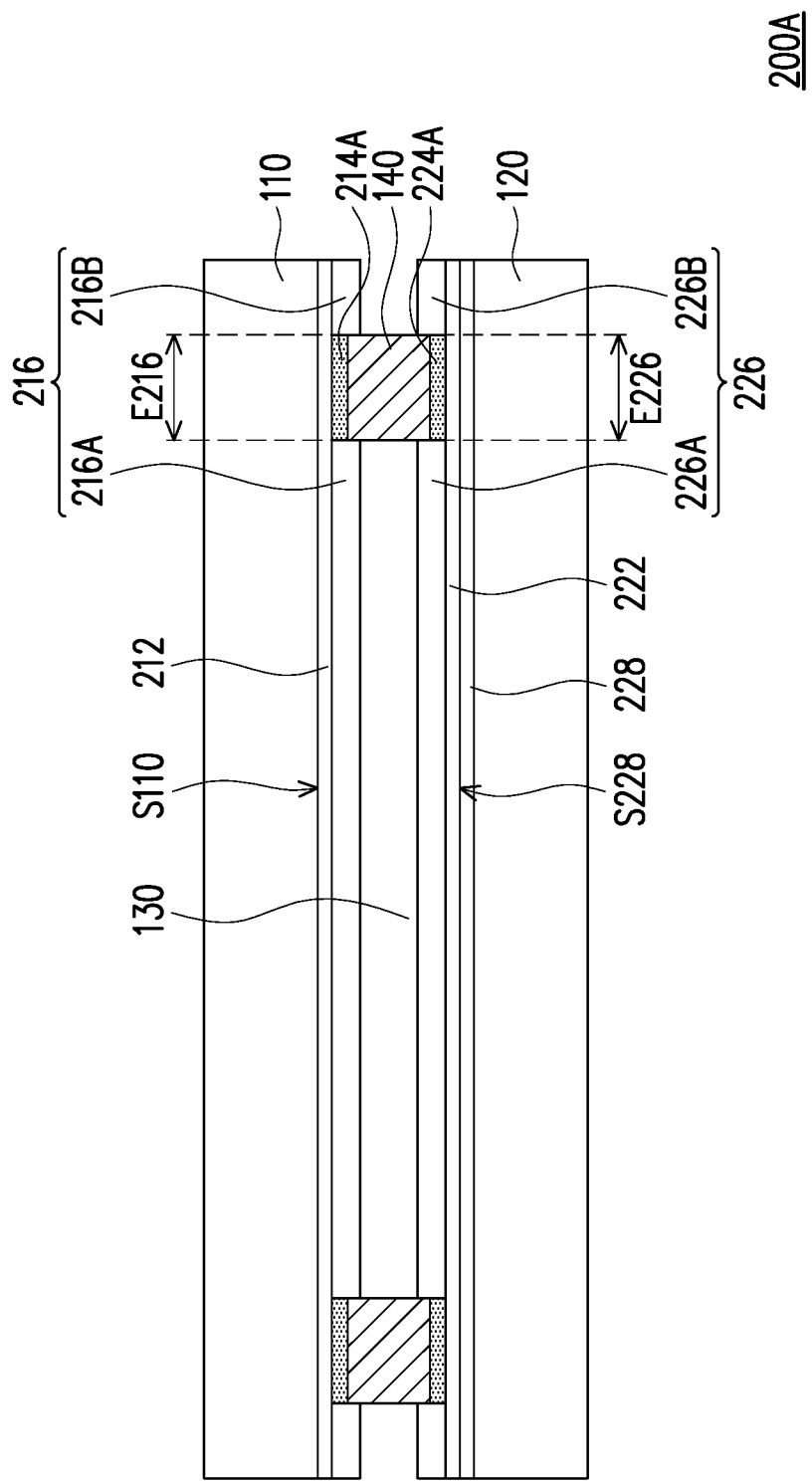
FIGS. 2-11 respectively schematically illustrate a display device in accordance with various embodiments of the disclosure.

FIGS. 2-11 respectively schematically illustrate a display device in accordance with various embodiments of the disclosure. In FIG. 2, a display device 200A may at least include a first substrate 110, a second substrate 120, a display medium layer 130, and a sealant 140, wherein the disposition relationship of the first substrate 110, the second substrate 120, the display medium layer 130, and the sealant 140 may be the same as those described in the embodiment of FIG. 1 and not reiterated here. Specifically, in some embodiments, the display medium layer 130 may be a liquid crystal layer and the display device 200A may be a liquid crystal display device.

In the display device 200A, a first film layer 212, a first protection pattern 214A and a first alignment layer 216 are further included and formed on the first substrate 110. The first film layer 212 is disposed on the first substrate 110 between the display medium layer 130 and the first substrate 110. The first protection pattern 214A is disposed between the first film layer 212 and the sealant 140, and the first protection pattern 214A is in contact with the sealant 140. The first alignment layer 216 is disposed between the display medium layer 130 and the first film layer 212. The first protection pattern 214A and the first alignment layer 216 are both in contact with and cover the first film layer 212.

In the display device 200A, a second film layer 222, a second protection pattern 224A, a second alignment layer 226 and an active device array 228 are further included and formed on the second substrate 120. The second film layer 222 is disposed on the second substrate 120 between the display medium layer 130 and the second substrate 120. The second protection pattern 224A is disposed between the second film layer 222 and the sealant 140, and the second protection pattern 224A is in contact with the sealant 140. The second alignment layer 226 is disposed between the display medium layer 130 and the second film layer 222. The active device array 228 is disposed between the second substrate 120 and the second film layer 222. In addition, the second protection pattern 224A and the second alignment layer 226 are both in contact with the second film layer 222.

In the embodiment, the first film layer 212 may be an electrode layer extending continuously in at least the region surrounded by the sealant 140. Specifically, the first film layer 212 may extend continuously from an edge of the first substrate 110 to an opposite edge of the first substrate 110, so that the entire of the inner surface S110 of the first substrate 110 facing the display medium layer 130 may be covered by the first film layer 212, but the disclosure is not limited thereto. In some embodiments, the first film layer 212 may cover a portion of the inner surface S110 without covering the entire of the inner surface S110. A material of the first film layer 212 may include transparent conductive material, such as ITO, IZO, IGZO, organic conductive material, etc.

The first protection pattern 214A is arranged corresponding to the distribution of the sealant 140. For example, the first protection pattern 214A and the sealant 140 may have substantially the same width, but the disclosure is not limited thereto. In the embodiment, the first protection pattern 214A may have specific optical property and protect the first film layer 212 from damages caused by radiation irradiating from the side of the first protection pattern 214A. In some embodiments, a light transmittance of the first protection pattern 214A at a wavelength in a range of 150 nm to 400 nm may be lower than 50%; a light transmittance of the first protection pattern 214A at a wavelength in a range of 500 nm to 560 nm may be lower than 50%; and/or a light transmittance of the first protection pattern 214A at a wavelength in a range of 1000 nm to 1200 nm may be lower than 50%. However, the disclosure is not limited thereto. In some alternative embodiments, the first protection pattern 214A may have a reflectivity of greater than 85% at a wavelength in a range of 150 nm to 400 nm, at a wavelength in a range of 500 nm to 560 nm, and/or at a wavelength in a range of 1000 nm to 1200 nm may be lower than 50%.

In some embodiments, the first protection pattern 214A may be a multi-layer stack including low refractive index layers and high refractive index layers stacked alternatively. The quantity of the low refractive index layers and the quantity of the high refractive index layers may be determined based on the required optical property. Each of the low refractive index layers may have a refractive index lower than 2, and each of the high refractive index layers may have a refractive index greater than 2. In some embodiments, the material of the low refractive index layer may include $SiO_2$ and the material of the high refractive index layer may include $TiO_2$, $Nb_2O_5$, and $Ta_2O_5$, but the disclosure is not limited thereto. In some alternative embodiments, the first protection pattern 214A may be a single layered structure which is formed by only one single layer. A material of the first protection pattern 214A with a single layer design may include a metal such as Al, Ag, Au, Cu, etc.

The first alignment layer 216 may be a patterned layer and include an inner alignment portion 216A and an outer alignment portion 216B with an absent region E216 therebetween. In other words, the first alignment layer 216 may be patterned to be partially removed and thus absent at the absent region E216. In the embodiment, the first protection pattern 214A is at least located in the absent region E216 so that the first film layer 212 is covered and protected by the first protection pattern 214A during the patterning process of the first alignment layer 216. For example, the first alignment layer 216 may be formed by coating an organic alignment material such as polyimide on the first substrate 110 and patterning the alignment material with a laser ablation process. In laser ablation process, a femtosecond laser or a picosecond laser may irradiate the alignment material in the absent region E216. The wavelength of the femtosecond laser or the picosecond laser may be in a range of 150 nm to 400 nm, in a range of 500 nm to 560 nm, and/or in a range of 1000 nm to 1200 nm. The first protection pattern 214A may have low transmittance at the above wavelengths so that only a small amount or none of the radiation of the femtosecond laser or the picosecond laser may penetrate the first protection pattern 214A. Accordingly, the first film layer 212 may subject to a small amount or none of the irradiation of the femtosecond laser or the picosecond laser and be hardly damaged by the femtosecond laser or the picosecond laser. In the embodiment, the thickness of the first alignment layer 216 may be greater than the thickness of the first protection pattern 214A, but the disclosure is not limited thereto.

On the second substrate 120, the active device array 228 is formed to generate the required electric field to drive the display medium layer 130 with the collaboration with the first film layer 212 while the first film layer 212 is an electrode layer. The active device array 228 may include thin film transistors (TFT) or complementary metal-oxide-semiconductor (CMOS) devices that are arranged in an array. In the case that the active device array 228 is a CMOS array, the second substrate 120 may be a semiconductor wafer and in the case that the active device array 228 is a TFT array, the second substrate 120 may be a glass substrate, a polymer substrate or the like.

The second film layer 222 on the second substrate 120 covers the active device array 228 and is made of insulation material to serve as an insulation protection layer protecting the active device array 228. The material of the second film layer 222 may include silicon oxide, silicon nitride, silicon oxynitride, or a combination thereof. The second film layer 222 may cover the inner surface S228 of the active device array 228 and extend from one edge of the second substrate 120 to an opposite edge of the second substrate 120 continuously. In some embodiments, the second film layer 222 may be formed of one single layer while in alternative embodiments the second film layer 222 may include multiple layers stacking in the thickness direction.

The second protection pattern 224A, similar to the first protection pattern 214A, is arranged corresponding to the sealant 140. In other words, when viewing the display device 200A in the thickness direction, the second protection pattern 224A may overlap the sealant 140. In addition, the first protection pattern 214A, the second protection pattern 224A and the sealant 140 may extend along with a common ring path. In the embodiment, the second protection pattern 224A may have the same width as the sealant 140, but the disclosure is not limited thereto. In some embodiments, the second protection pattern 224A may be wider than the sealant 140 to exceed the sealant 140. In the case the second protection pattern 224A is wider than the sealant 140, the second protection pattern 224A may overlap the display medium layer 130 without overlapping the display region of the display device 200A.

Similar to the first protection pattern 214A, the second protection pattern 224A may have specific optical property based on the design requirement. For example, the second protection pattern 224A may have low transmittance (lower than 50%), and/or high reflectivity (greater than 85%) at the wavelength in a range of 150 nm to 400 nm, the wavelength in a range of 500 nm to 560 nm, and/or wavelength in a range of 1000 nm to 1200 nm. The material of the second protection pattern 224A may be selected from one or more of the material capable of forming the first protection pattern 214A. For example, the second protection pattern 224A may be a single layer structure made of metal or a multi-layer stack including low refractive index layers and high refractive index layers alternately stacked.

The material of the second alignment layer 226 may include an organic alignment material such as polyimide. In some embodiments, the material of the first alignment layer 216 may be the same as the material of the second alignment layer 226, but the disclosure is not limited thereto. The second alignment layer 226 formed on the second substrate 120 may be patterned to include an inner alignment portion 226A and an outer alignment portion 226B. The inner alignment portion 226A may continuously extend in the region surrounded by the sealant 140 and be in direct contact with the display medium layer 130. The inner alignment portion 226A may have microstructures on the surface in contact with the material of the display medium layer 130 so as to orient and/or tilt the material of the display medium layer 130 in a designated orientation and/or tilt angle. The outer alignment portion 226B is separated from the inner alignment portion 226A by an absent region E226 and the outer alignment portion 226B may extend to the edge of the second substrate 120, but the disclosure is not limited thereto. In the embodiment, the second alignment layer 226 may be thicker than the second protection pattern 224A, but the disclosure is not limited thereto.

In the embodiment, the protection pattern 224A may at least fill the absent region E226. The second alignment layer 226 is patterned by a laser ablation process, and the laser used for patterning the second alignment layer 226 may be the same as that used for patterning the first alignment layer 216 as described in above. During the laser ablation process, the alignment material in the absent region E226 is removed by the irradiation of the laser. In the embodiment, the second protection pattern 224A is formed prior to the second alignment layer 226 and is positioned at least within the absent region E226. Therefore, the laser may irradiate the second protection pattern 224A prior to irradiating on the second film layer 222. The optical property of the second protection pattern 224A is so designed to have low transmittance at the wavelength of the laser utilized in the laser ablation process. Accordingly, only a small amount or none of the laser is able to irradiate on the second film layer 222 covered by the second protection pattern 224A, such that the second film layer 222 is hardly damaged by the laser utilized in the laser ablation process, which improves the yield of the display device 200A.

Figure 3:
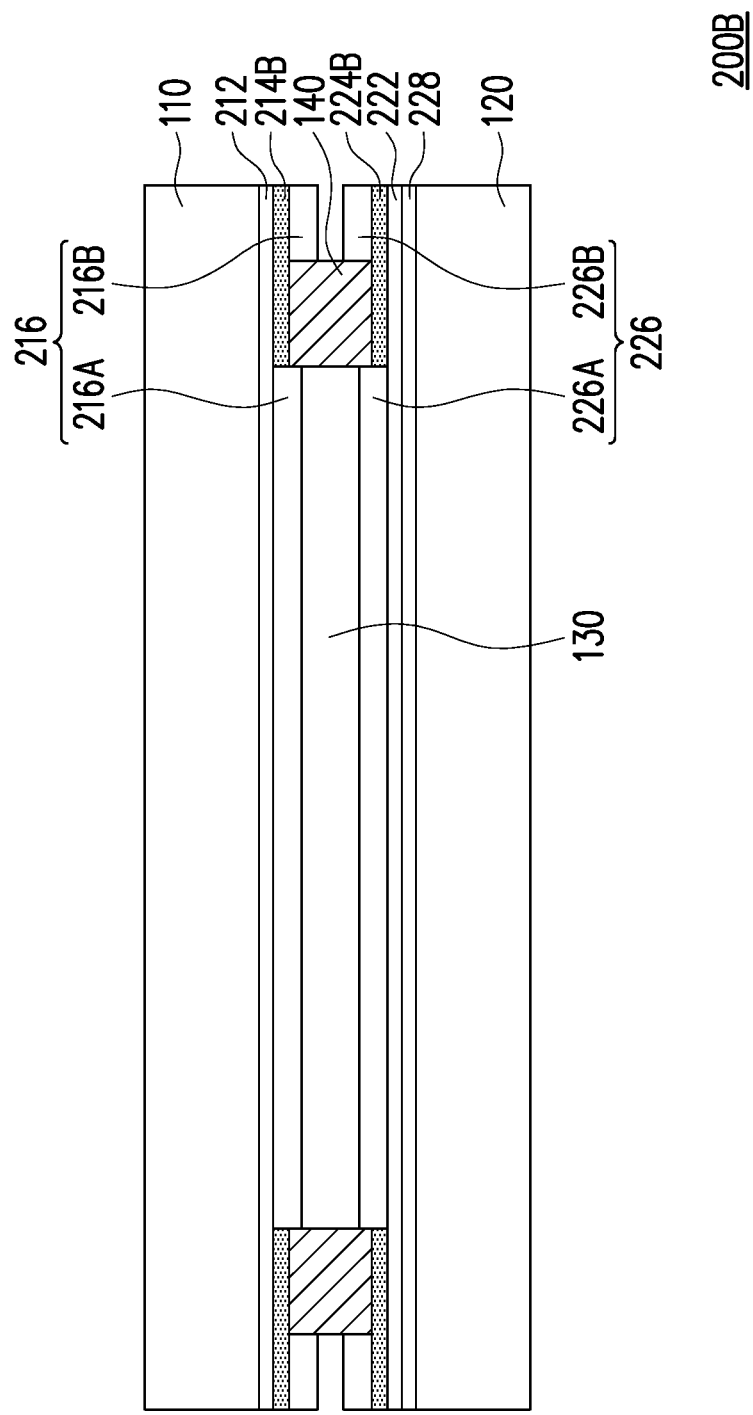

In FIG. 3, a display device 200B is similar to the display device 200A, and the same reference numbers in the two embodiments present the same components/layers so that the details of the same components/layers are not reiterated here. Specifically, the display device 200B includes a first substrate 110, a second substrate 120, a display medium layer 130, and a sealant 140. The display device 200B further includes a first film layer 212, a first protection pattern 214B, and a first alignment layer 216 formed on the first substrate 110 and further includes a second film layer 222, a second protection pattern 224B, a second alignment layer 226 and an active device array 228 formed on the second substrate 120. In the embodiment, the first alignment layer 216 may include an inner alignment portion 216A in contact with the display medium layer 130 and an outer alignment portion 216B spaced from the inner alignment portion 216A. The second alignment layer 226 may include an inner alignment portion 226A in contact with the display medium layer 130 and an outer alignment portion 226B spaced from the inner alignment portion 216A. Specifically, the display device 200B is different from the display device 200A in the pattern designs of the first protection pattern 214B and the second protection pattern 224B.

In FIG. 3, the first protection pattern 214B may be made of the material the same as the first protection pattern 214A in FIG. 2. The first protection pattern 214B may extend exceeding the sealant 140 in a direction away from the display medium layer 130 to the edge of the first substrate 110. When viewing the display device 200B in the thickness direction, the first protection pattern 214B may not overlap the display medium layer 130, but overlap the region outside the display medium layer 130. For example, when viewing the display device 200B in the thickness direction, the first protection pattern 214B overlaps the sealant 140 and the outer alignment portion 216B of the first alignment layer 216 without overlapping the inner alignment portion 216A of the first alignment layer 216.

The second protection pattern 224B may have a design similar to the first protection pattern 214B. Specifically, the second protection pattern 224B at least extends in the gap between the inner alignment portion 226A and the outer alignment portion 226B and overlaps the outer alignment portion 226B. The edge of the second protection pattern 224B may overlap the edge of the second substrate 120. When viewing the display device 200B in the thickness direction, the second protection pattern 224B may overlap the sealant 140 and the outer alignment portion 226B without overlapping the inner alignment portion 226A and the display medium layer 130. However, the disclosure is not limited thereto. In some embodiments, the edge of the first protection pattern 214B and/or the edge of the second protection pattern 224B may be located between the sealant 140 and the edge of the first substrate 110 and/or the second substrate 120.

Figure 4:
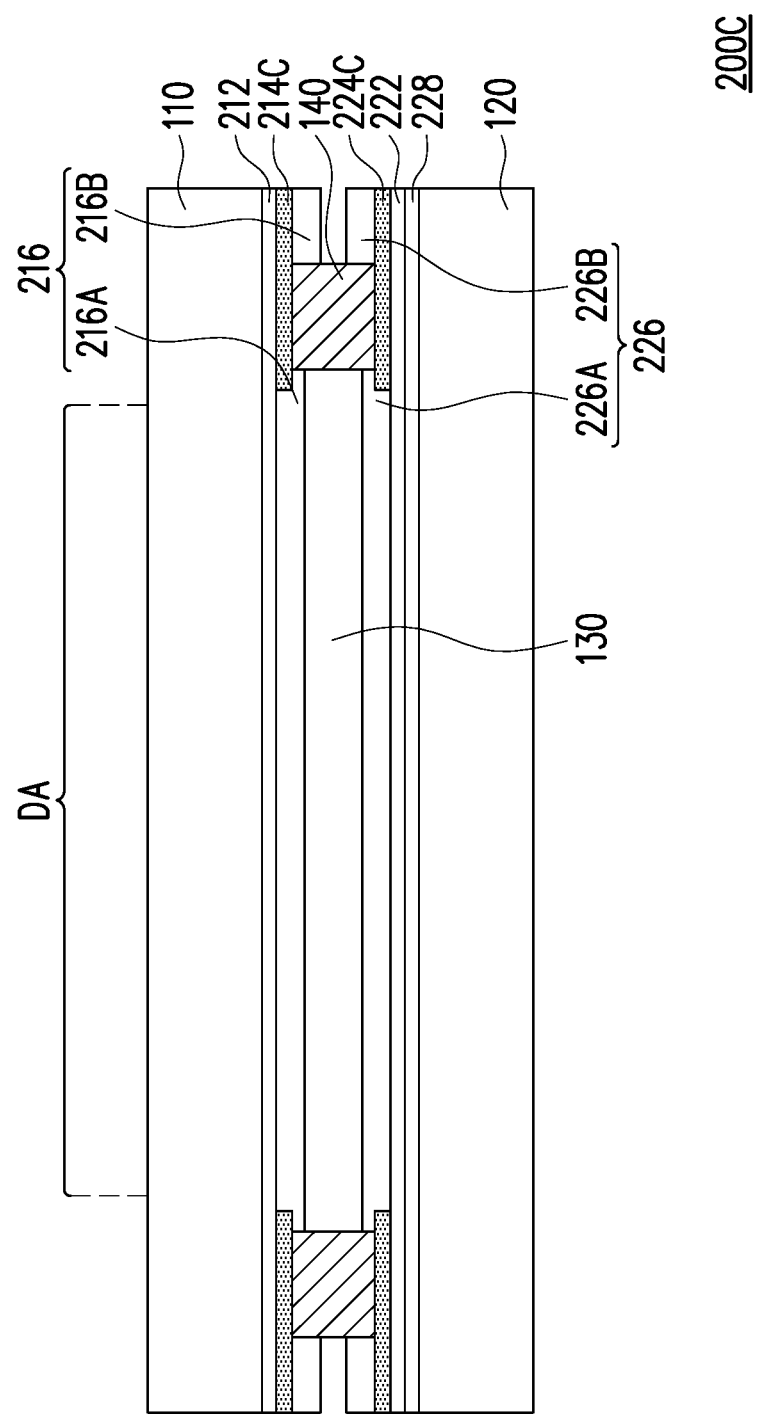

In FIG. 4, a display device 200C is similar to the display device 200B, wherein the same reference numbers used in the two embodiments represent the same components/layers and the details of the same components/layers are not repeated here. The display device 200C includes a first substrate 110, a second substrate 120, a display medium layer 130, and a sealant 140, wherein a first film layer 212, a first protection pattern 214C, and a first alignment layer 216 including an inner alignment portion 216A and an outer alignment portion 216B are disposed on the first substrate 110, and a second film layer 222, a second protection pattern 224C, a second alignment layer 226 including an inner alignment portion 226A and an outer alignment portion 226B and an active device array 228 are disposed on the second substrate 120. In the display device 200C, the first protection pattern 214C may have a different pattern design from the first protection pattern 214B and the second protection pattern 224C may have a different pattern design from the second protection pattern 224B.

Specifically, the first protection pattern 214C not only overlaps the sealant 140 and the outer alignment portion 216B, but also overlaps the inner alignment portion 216A and the display medium layer 130. Similarly, the second protection pattern 224C not only overlaps the sealant 140 and the outer alignment portion 226B, but also overlaps the inner alignment portion 226A and the display medium layer 130. In the embodiment, the display device 200C may display images within the display region DA that may be smaller than the region surrounded by the sealant 140. When viewing the display device 200C in the thickness direction, the first protection pattern 214C may not overlap the display region DA though the first protection overlaps the inner alignment portion 216A and the display medium layer 130. Similarly, the second protection pattern 224C may not overlap the display region DA when viewing the display device 200C in the thickness direction. Accordingly, the first protection pattern 214C and the second protection pattern 224C though overlaps the inner alignment portions 216A and 226A and the display medium layer 130 do not influence on the display effect of the display device 200C.

Figure 5:
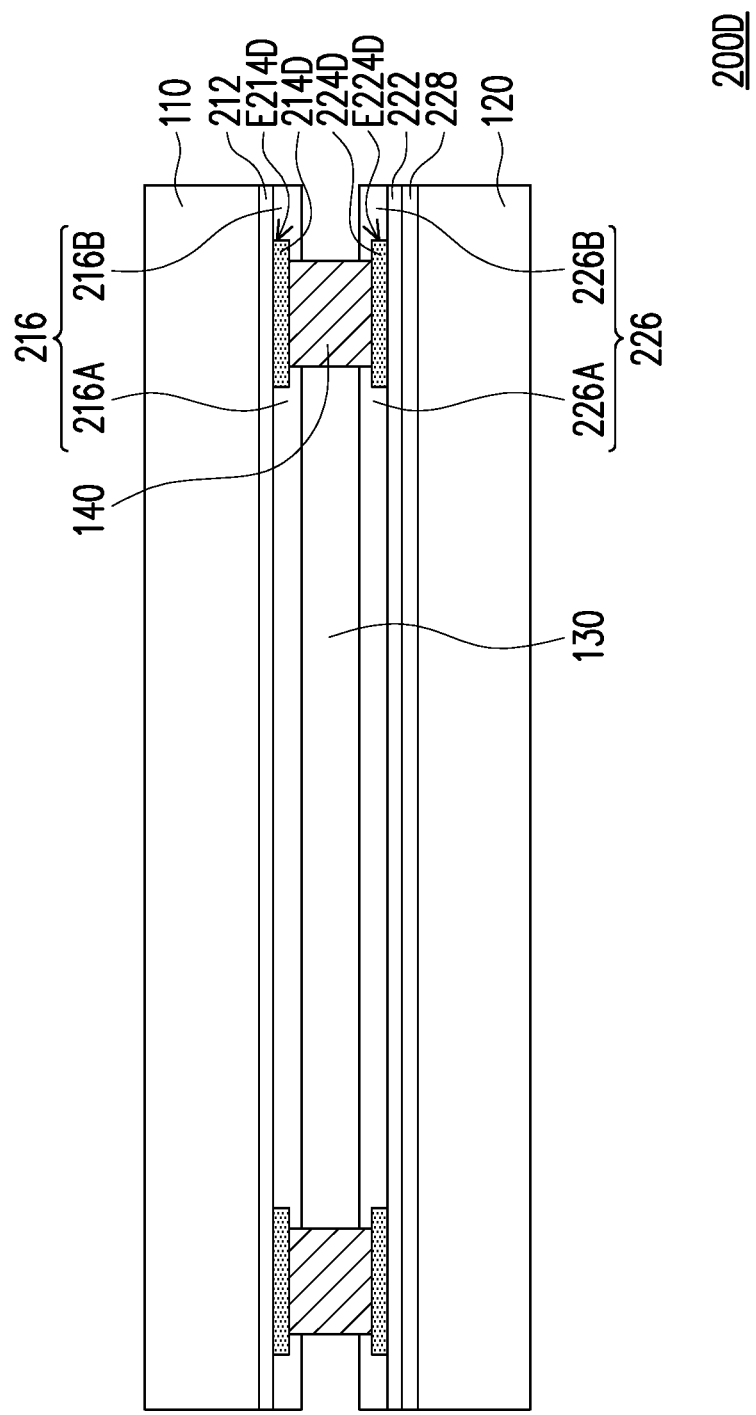

In FIG. 5, a display device 200D is similar to the display device 200C, wherein the same reference numbers used in the two embodiments represent the same components/layers and the details of the same components/layers are not repeated here. The display device 200D includes a first substrate 110, a second substrate 120, a display medium layer 130, and a sealant 140, wherein a first film layer 212, a first protection pattern 214D, and a first alignment layer 216 including an inner alignment portion 216A and an outer alignment portion 216B are disposed on the first substrate 110, and a second film layer 222, a second protection pattern 224D, a second alignment layer 226 including an inner alignment portion 226A and an outer alignment portion 226B, and an active device array 228 are disposed on the second substrate 120. In the display device 200D, the first protection pattern 214D may have a different pattern design from the first protection pattern 214C and the second protection pattern 224D may have a different pattern design from the second protection pattern 224C.

In the embodiments, the first protection pattern 214D may overlaps the inner alignment portion 216A, the sealant 140, and the outer alignment portion 216B, but the edge E214D of the first protection pattern 214D may be located between the sealant 140 and the edge of the first substrate 110. In some embodiments, the edge E214D may be covered by the outer alignment portion 216B. Similarly, the second protection pattern 214D may overlap the inner alignment portion 226A, the sealant 140 and the outer alignment portion 226B while the edge E224D of the second protection pattern 224D is covered by the outer alignment portion 226B.

Figure 6:
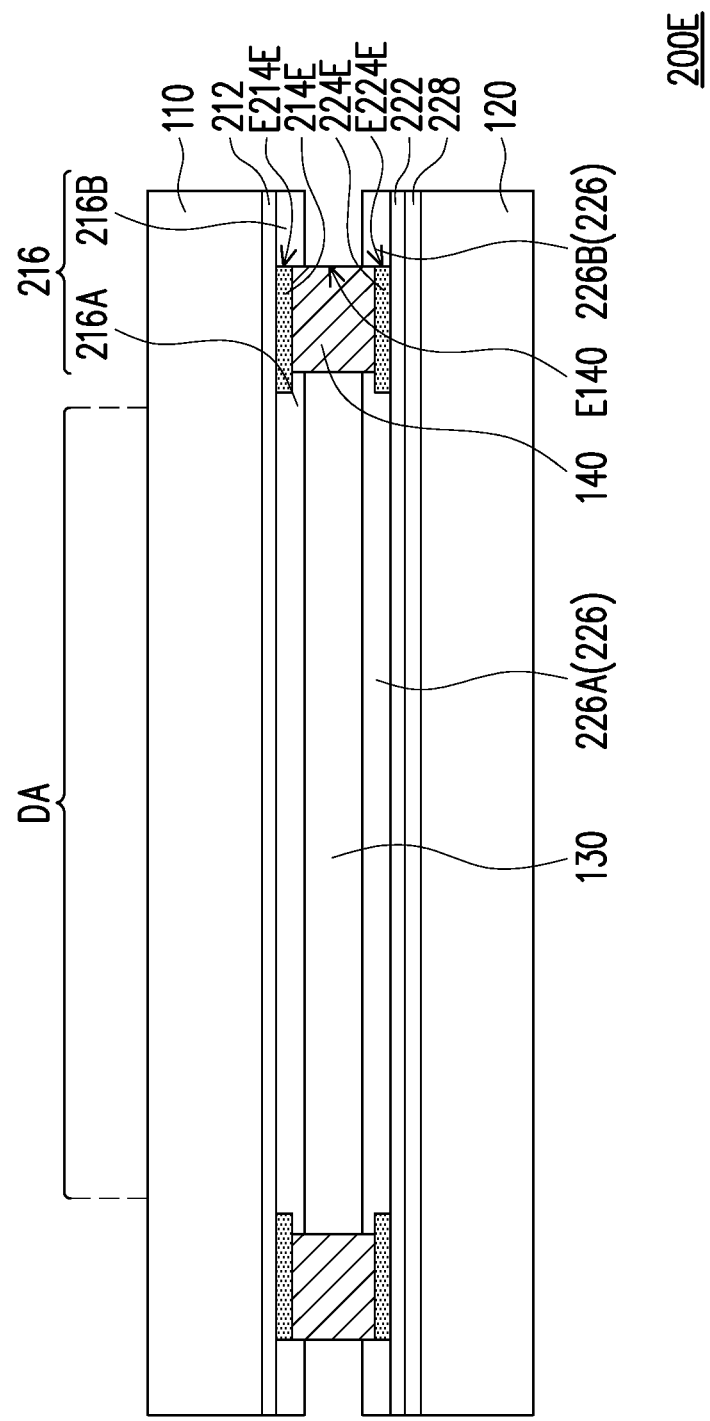

In FIG. 6, a display device 200E is similar to the display device 200C, wherein the same reference numbers used in the two embodiments represent the same components/layers and the details of the same components/layers are not repeated here. The display device 200E includes a first substrate 110, a second substrate 120, a display medium layer 130, and a sealant 140, wherein a first film layer 212, a first protection pattern 214E, and a first alignment layer 216 including an inner alignment portion 216A and an outer alignment portion 216B are disposed on the first substrate 110, and a second film layer 222, a second protection pattern 224E, a second alignment layer 226 including an inner alignment portion 226A and an outer alignment portion 226B, and an active device array 228 are disposed on the second substrate 120. In the display device 200E, the first protection pattern 214E may have a different pattern design from the first protection pattern 214C and the second protection pattern 224E may have a different pattern design from the second protection pattern 224C.

In the embodiments, the first protection pattern 214E may overlaps the inner alignment portion 216A and the sealant 140, and the edge E214E of the first protection pattern 214E may be aligned with the edge E140 of the sealant 140. Similarly, the second protection pattern 224E may overlap the inner alignment portion 226A and the sealant 140 while the edge E224E of the second protection pattern 224E is aligned with the edge E140 of the sealant 140. In the embodiment, the first protection pattern 214E and the second protection pattern 224E though respectively overlaps the inner alignment portion 216A and the inner alignment portion 226A, they do not overlap the display region DA of the display device 200E that displays images.

Figure 7:
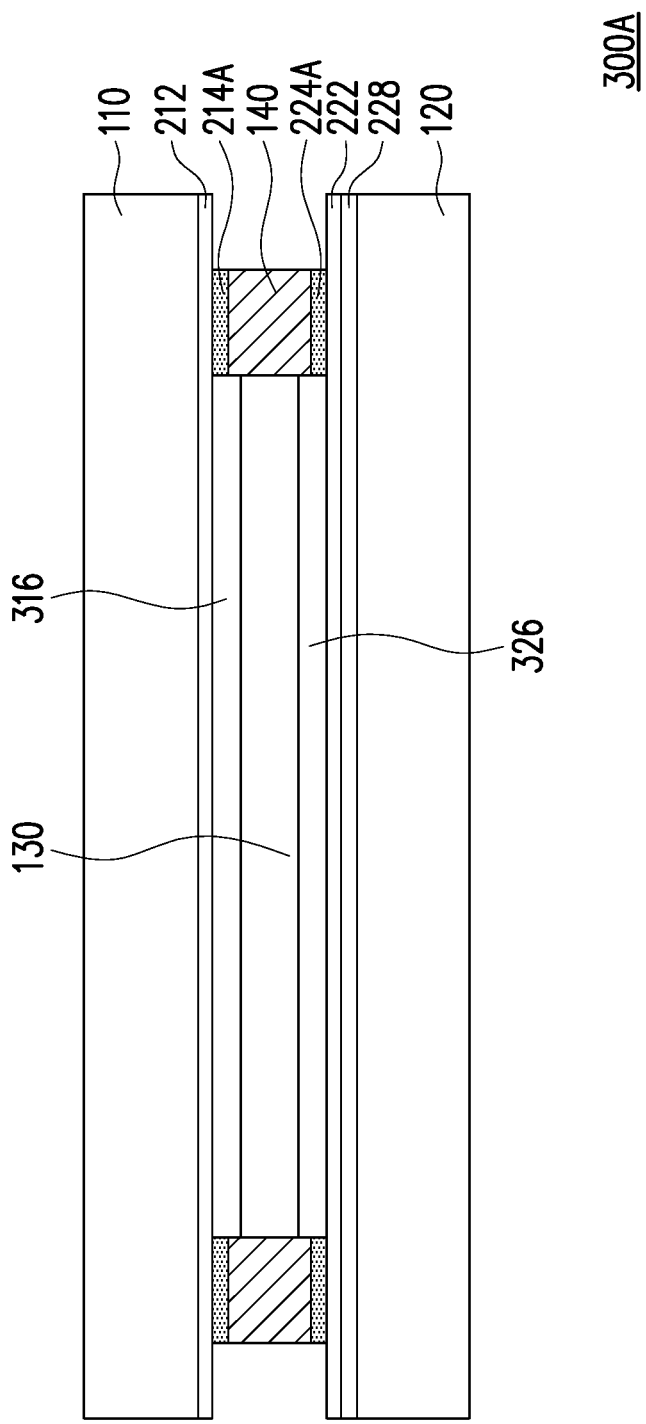

In FIG. 7, a display device 300A is similar to the display device 200A, wherein the same reference numbers used in the two embodiments represent the same components/layers and the details of the same components/layers are not repeated here. The display device 300A includes a first substrate 110, a second substrate 120, a display medium layer 130, and a sealant 140, wherein a first film layer 212, a first protection pattern 214A, and a first alignment layer 316 are disposed on the first substrate 110, and a second film layer 222, a second protection pattern 224A, a second alignment layer 326 and an active device array 228 are disposed on the second substrate 120. In the display device 300A, the first alignment layer 316 may have a different pattern design from the first alignment layer 216 and the second alignment layer 326 may have a different pattern design from the second alignment layer 226. Specifically, in the embodiment, the first alignment layer 316 is completely disposed within the region surrounded by the sealant 140 and the second alignment layer 326 is completely disposed within the region surrounded by the sealant 140. In other words, the display device 300A is different from the display device 200A that the outer alignment portions 216B and 226B are omitted.

Figure 8:
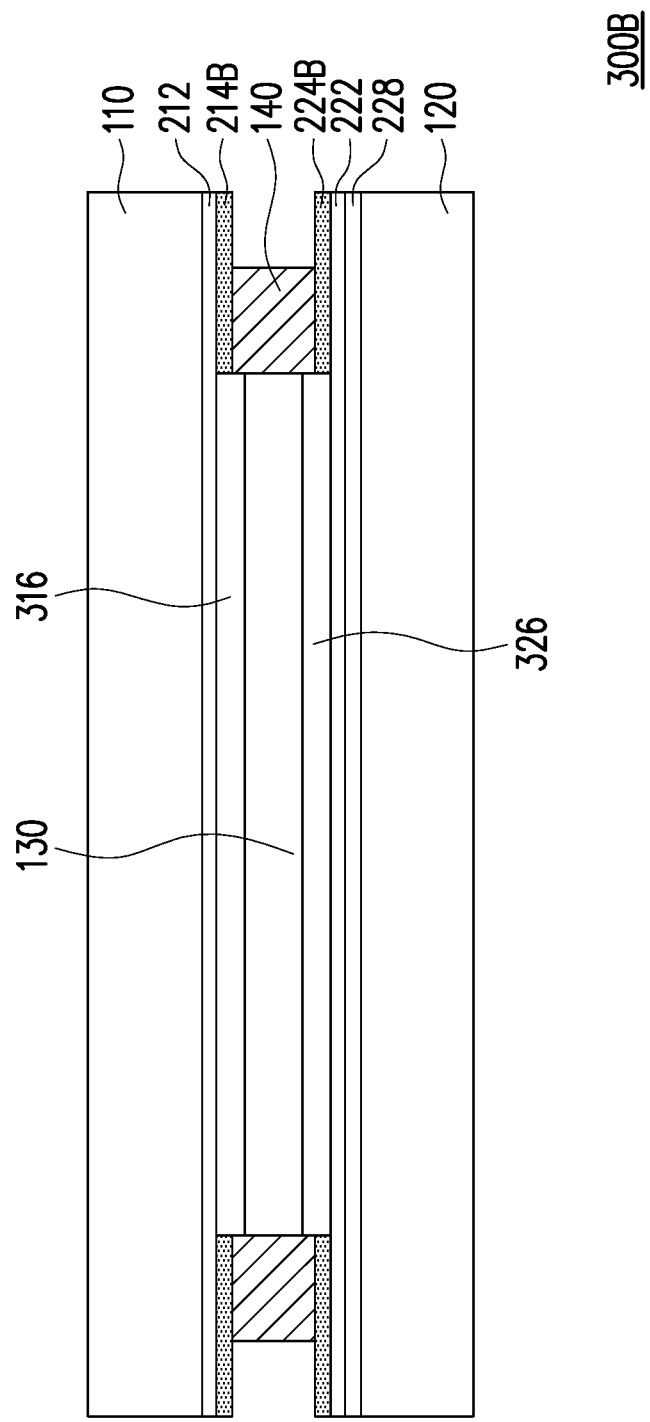

In FIG. 8, a display device 300B is similar to the display device 200B, wherein the same reference numbers used in the two embodiments represent the same components/layers and the details of the same components/layers are not repeated here. The display device 300B includes a first substrate 110, a second substrate 120, a display medium layer 130, and a sealant 140, wherein a first film layer 212, a first protection pattern 214B, and a first alignment layer 316 are disposed on the first substrate 110, and a second film layer 222, a second protection pattern 224B, a second alignment layer 326 and an active device array 228 are disposed on the second substrate 120. In the display device 300B, the first alignment layer 316 may have a different pattern design from the first alignment layer 216 and the second alignment layer 326 may have a different pattern design from the second alignment layer 226. Specifically, in the embodiment, the first alignment layer 316 is completely disposed within the region surrounded by the sealant 140 and the second alignment layer 326 is completely disposed within the region surrounded by the sealant 140. In other words, the display device 300B is different from the display device 200B that the outer alignment portions 216B and 226B are omitted. Specifically, the portion of the first protection pattern 214B extending between the sealant 140 and the edge of the first substrate 110 and the portion of the second protection pattern 224B extending between the sealant 140 and the edge of the second substrate 120 may be exposed.

Figure 9:
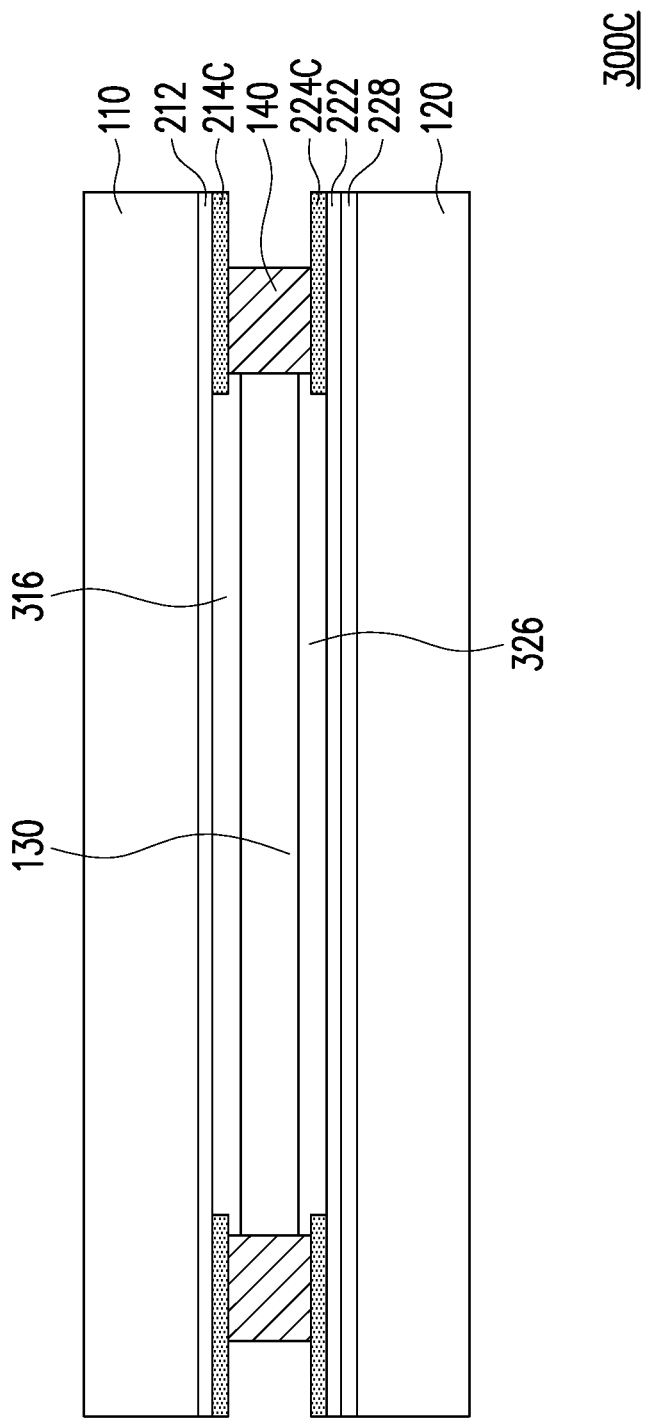

In FIG. 9, a display device 300C is similar to the display device 200C, wherein the same reference numbers used in the two embodiments represent the same components/layers and the details of the same components/layers are not repeated here. The display device 300C includes a first substrate 110, a second substrate 120, a display medium layer 130, and a sealant 140, wherein a first film layer 212, a first protection pattern 214C, and a first alignment layer 316 are disposed on the first substrate 110, and a second film layer 222, a second protection pattern 224C, a second alignment layer 326 and an active device array 228 are disposed on the second substrate 120. In the display device 300C, the first alignment layer 316 may have a different pattern design from the first alignment layer 216 and the second alignment layer 326 may have a different pattern design from the second alignment layer 226. Specifically, in the embodiment, the first alignment layer 316 is completely disposed within the region surrounded by the sealant 140 and the second alignment layer 326 is completely disposed within the region surrounded by the sealant 140. In other words, the display device 300C is different from the display device 200C that the outer alignment portions 216B and 226B are omitted. Specifically, the portion of the first protection pattern 214C extending between the sealant 140 and the edge of the first substrate 110 and the portion of the second protection pattern 224C extending between the sealant 140 and the edge of the second substrate 120 may be exposed.

Figure 10:
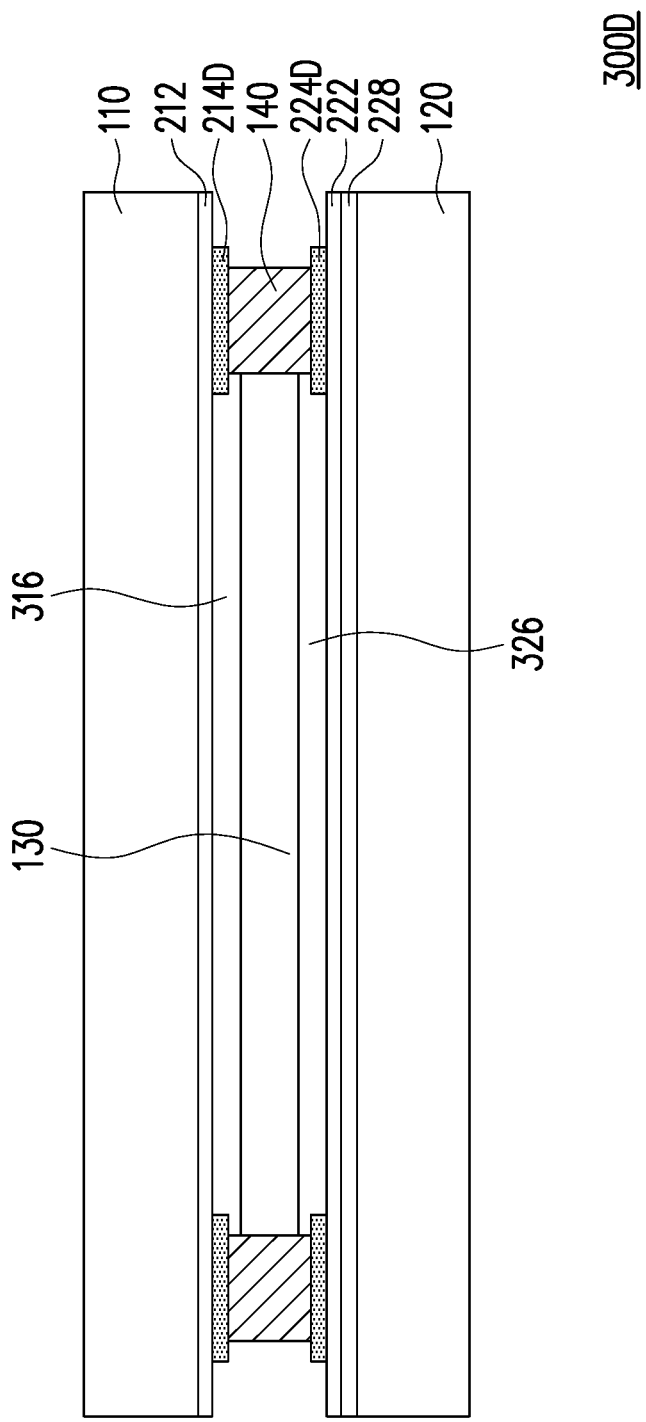

In FIG. 10, a display device 300D is similar to the display device 200D, wherein the same reference numbers used in the two embodiments represent the same components/layers and the details of the same components/layers are not repeated here. The display device 300D includes a first substrate 110, a second substrate 120, a display medium layer 130, and a sealant 140, wherein a first film layer 212, a first protection pattern 214D, and a first alignment layer 316 are disposed on the first substrate 110, and a second film layer 222, a second protection pattern 224D, a second alignment layer 326 and an active device array 228 are disposed on the second substrate 120. In the display device 300D, the first alignment layer 316 may have a different pattern design from the first alignment layer 216 and the second alignment layer 326 may have a different pattern design from the second alignment layer 226. Specifically, in the embodiment, the first alignment layer 316 is completely disposed within the region surrounded by the sealant 140 and the second alignment layer 326 is completely disposed within the region surrounded by the sealant 140. In other words, the display device 300D is different from the display device 200D that the outer alignment portions 216B and 226B are omitted. Specifically, the portion of the first protection pattern 214D extending between the sealant 140 and the edge of the first substrate 110 and the portion of the second protection pattern 224D extending between the sealant 140 and the edge of the second substrate 120 may be exposed.

Figure 11:
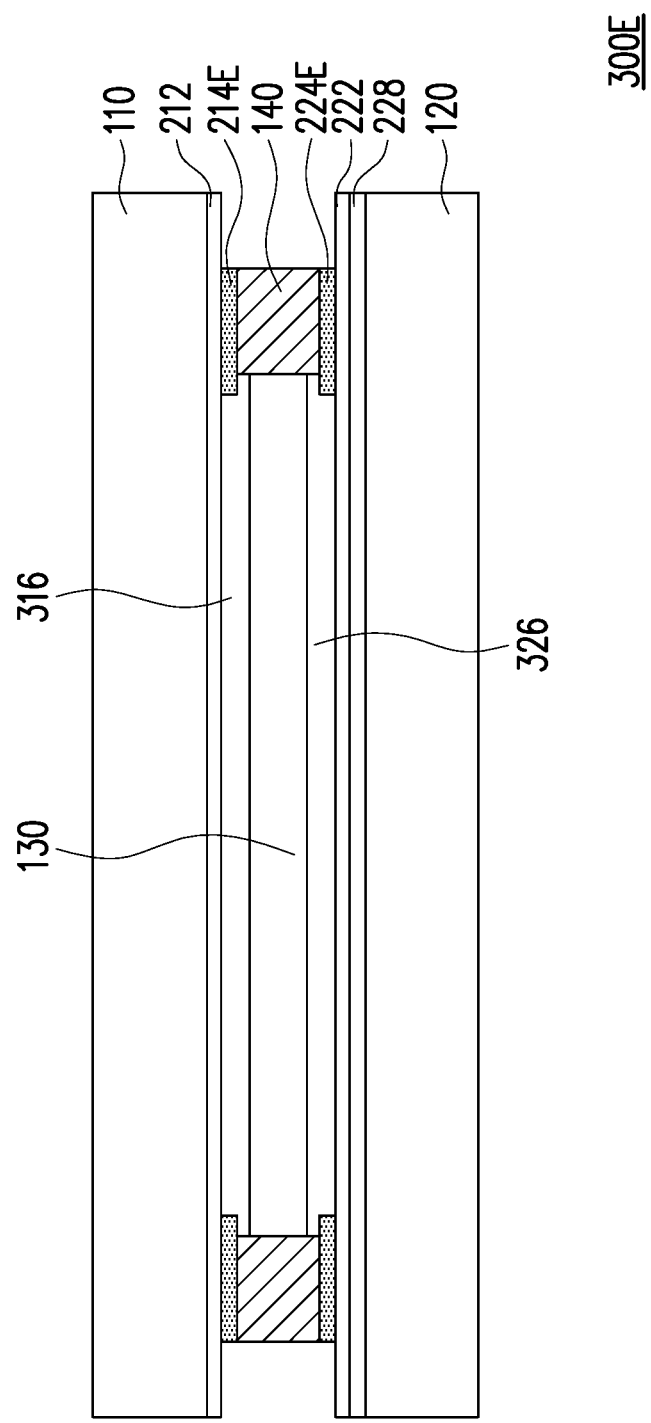

In FIG. 11, a display device 300E is similar to the display device 200E, wherein the same reference numbers used in the two embodiments represent the same components/layers and the details of the same components/layers are not repeated here. The display device 300E includes a first substrate 110, a second substrate 120, a display medium layer 130, and a sealant 140, wherein a first film layer 212, a first protection pattern 214E, and a first alignment layer 316 are disposed on the first substrate 110, and a second film layer 222, a second protection pattern 224E, a second alignment layer 326 and an active device array 228 are disposed on the second substrate 120. In the display device 300E, the first alignment layer 316 may have a different pattern design from the first alignment layer 216 and the second alignment layer 326 may have a different pattern design from the second alignment layer 226. Specifically, in the embodiment, the first alignment layer 316 is completely disposed within the region surrounded by the sealant 140 and the second alignment layer 326 is completely disposed within the region surrounded by the sealant 140. In other words, the display device 300E is different from the display device 200E that the outer alignment portions 216B and 226B are omitted.

Figure 12:
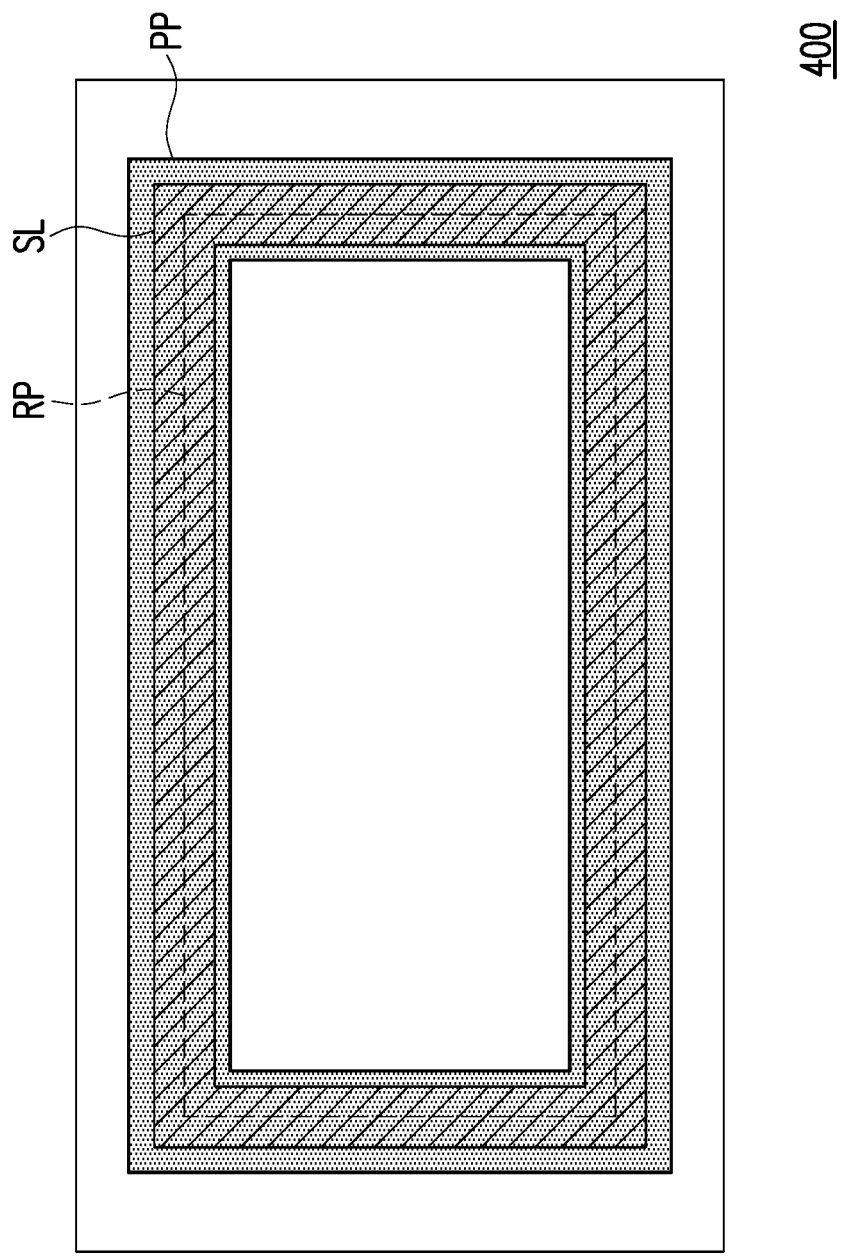
FIG. 12 and FIG. 13 each schematically illustrates a top view of a display device in accordance with some embodiments of the disclosure, wherein FIG. 12 only presents the sealant and the protection pattern in the top view and other components in the display device are omitted for illustration purpose.
Figure 13:
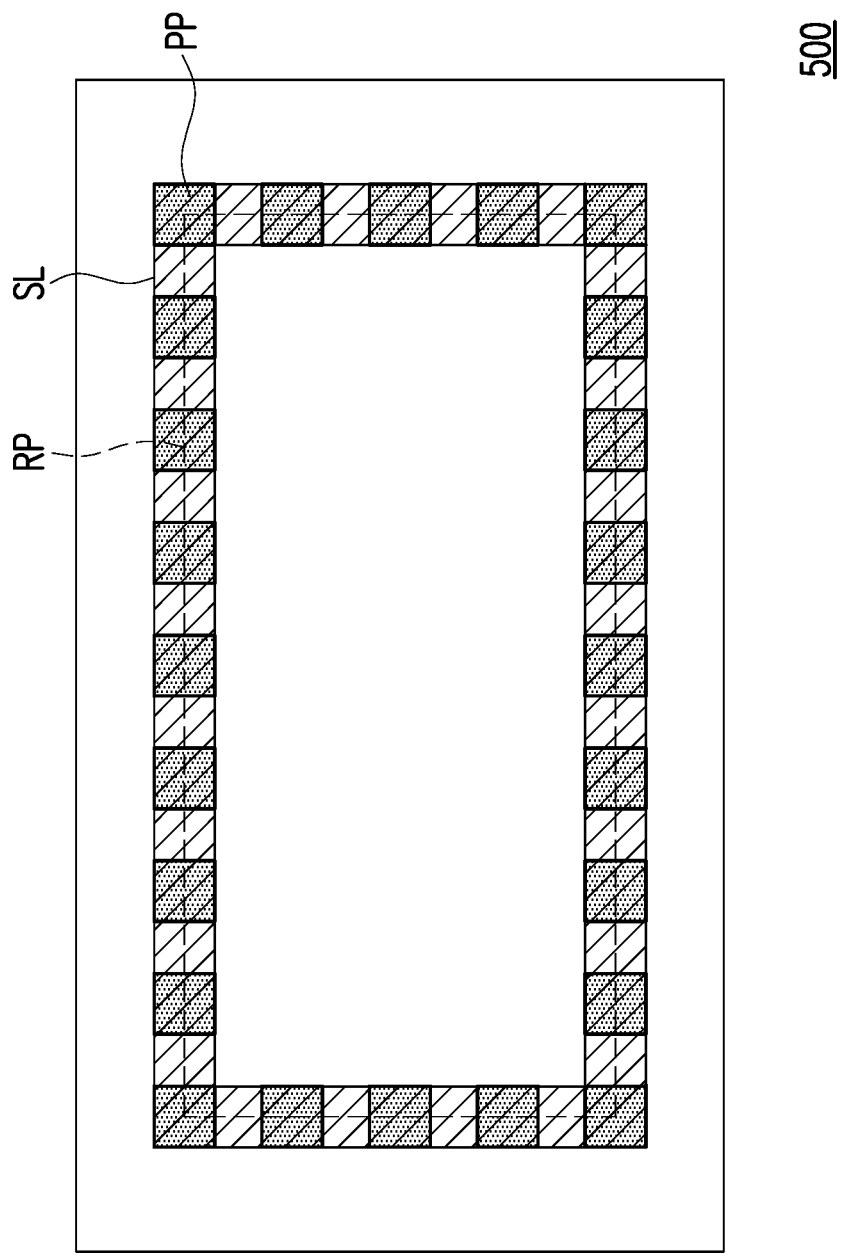

FIG. 12 and FIG. 13 each schematically illustrates a top view of a display device in accordance with some embodiments of the disclosure, wherein FIG. 12 only presents the sealant and the protection pattern in the top view and other components in the display device are omitted for illustration purpose. In FIG. 12, a display device 400 is presented that a sealant SL and a protection pattern PP are arranged along with a common ring path RP. The sealant SL may continuously extend along the common ring path RP and the protection pattern PP may also continuously extend along the common ring path RP. In FIG. 12 the width of the protection pattern PP may be greater than the sealant SL, but the disclosure is not limited thereto. In some embodiments, the width of the protection pattern PP may be the same as the width of the sealant SL. In FIG. 13, the sealant SL and the protection pattern PP are arranged along with a common ring path RP while the protection pattern PP is discontinuously arranged along the common ring path RP. The arrangements of the sealant SL and the protection pattern PP shown in FIG. 12 and FIG. 13 may be applicable to any of the above embodiments to serve as an implemental method for the sealant 140 and the protection patterns (160, 214A-214E, and 224A-224E).

In view of the above, the display device in accordance with some embodiments of the disclosure includes the protection pattern disposed at an absent region where the alignment material is removed. Therefore, the film layer covered by the protection pattern may hardly be damaged by the radiation utilized in the process of patterning the alignment layer and the display device may have improved yield and quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
a first substrate;
a second substrate;
a display medium layer disposed between the first substrate and the second substrate;
a sealant disposed between the first substrate and the second substrate and surrounding the display medium layer;
a first film layer disposed on the first substrate between the first substrate and the display medium layer;
a first protection pattern disposed between the first film layer and the sealant; and
a first alignment layer disposed on the first substrate between the first film layer and the display medium layer, wherein the first protection pattern is in contact with the sealant and exposed by the first alignment layer, wherein the first protection pattern and the first alignment layer are both in contact with the first film layer, wherein the first protection pattern is disposed between the first film layer and the sealant, and wherein the thickness of the first alignment layer is greater than the thickness of the first protection pattern.

2. The display device of claim 1, wherein a light transmittance of the first protection pattern at a wavelength in a range of 150 nm to 400 nm is lower than 50%.

3. The display device of claim 1, wherein a light transmittance of the protection pattern at a wavelength in a range of 500 nm to 560 nm is lower than 50%.

4. The display device of claim 1, wherein a light transmittance of the protection pattern at a wavelength in a range of 1000 nm to 1200 nm is lower than 50%.

5. The display device of claim 1, wherein the sealant and the protection pattern both extend along a common ring path.

6. The display device of claim 5, wherein the protection pattern is discontinuously arranged along the common ring path.

7. The display device of claim 1, wherein the protection pattern is a multi-layer stack.

8. The display device of claim 7, wherein the multi-layer stack comprises a low refractive index layer and a high refractive index layer, the low refractive index layer has a refractive index lower than 2, and the high refractive index layer has a refractive index greater than 2.

9. The display device of claim 8, wherein a material of the low refractive index layer comprises $SiO_2$.

10. The display device of claim 8, wherein a material of the high refractive index layer comprises one or more selected from $TiO_2$, $Nb_2O_5$, and $Ta_2O_5$.

11. The display device of claim 1, wherein a material of the protection pattern comprises a metal.

12. The display device of claim 1, wherein the first alignment layer comprises an inner alignment portion and an outer alignment portion, and the sealant is positioned between the inner alignment portion and the outer alignment portion.

13. The display device of claim 1, wherein a portion of the protection layer exceeds the sealant and is covered by the first alignment layer.

14. The display device of claim 1, wherein the first film layer is an electrode layer.

15. The display device of claim 1, further comprising an active device array formed on the first substrate.

16. The display device of claim 15, wherein the first film layer is an insulation protection layer covering the active device array.

17. The display device of claim 1, further comprising a second alignment layer disposed on the second substrate between the second substrate and the display medium layer.

18. The display device of claim 17, further comprising a second film layer disposed on the second substrate between the second alignment layer and the second substrate.

19. The display device of claim 18, further comprising a second protection pattern disposed between the second substrate and the sealant, wherein the second protection pattern is in contact with the sealant and exposed by the second alignment layer and the second protection pattern and the second alignment layer are both in contact with the second film layer.

20. The display device of claim 18, wherein one of the first film layer and the second film layer is an electrode layer and the other is an insulation protection layer.

* * * * *